United States Patent [19]
Enderle et al.

[11] Patent Number: 5,186,390
[45] Date of Patent: Feb. 16, 1993

[54] PROPELLING NOZZLE

[75] Inventors: Heinrich Enderle, Gröbenzell; Jörg Heyse, Gerlingen; Helmut-Arnd Geidel, Karlsfeld, all of Fed. Rep. of Germany

[73] Assignee: MTU Motoren-und Turbinen-Union Munchen GmbH, Fed. Rep. of Germany

[21] Appl. No.: 721,641

[22] PCT Filed: Jan. 16, 1990

[86] PCT No.: PCT/DE90/00020

§ 371 Date: Sep. 19, 1991

§ 102(e) Date: Sep. 19, 1991

[87] PCT Pub. No.: WO90/08254

PCT Pub. Date: Jul. 26, 1990

[30] Foreign Application Priority Data

Jan. 16, 1989 [DE] Fed. Rep. of Germany ....... 3901487

[51] Int. Cl.$^5$ .................... F02K 1/12; F02K 3/10; F02K 9/78; B64D 27/16
[52] U.S. Cl. .................... 239/265.37; 239/265.35; 60/230; 60/270.1; 60/271; 244/125; 244/73 R
[58] Field of Search .................. 239/265.19, 265.25, 239/265.33, 265.37, 265.39, 265.41; 60/270.1, 271, 225, 244, 230; 244/12.5, 23 D, 53 R, 53 B, 55, 73 R, 62, 74

[56] References Cited

U.S. PATENT DOCUMENTS

| | | |
|---|---|---|
| 2,880,575 | 4/1959 | Scialla . |
| 2,969,189 | 1/1961 | Jordan . |
| 2,995,010 | 8/1961 | Arscott . |
| 3,046,730 | 7/1962 | Petren ............................ 239/265.39 |
| 3,289,946 | 12/1966 | Lennard ......................... 239/265.39 |
| 3,302,889 | 2/1967 | Sabato ........................... 239/265.39 |
| 3,324,660 | 6/1967 | Lane et al. ........................ 60/270.1 |
| 3,792,815 | 2/1974 | Swavely et al. ................ 239/265.39 |
| 3,873,027 | 3/1975 | Camboulives et al. ........ 239/265.41 |
| 4,919,364 | 4/1990 | John et al. ............................ 60/225 |
| 5,094,070 | 3/1992 | Enderle ................................. 60/225 |

FOREIGN PATENT DOCUMENTS

| | | |
|---|---|---|
| 2711936 | 9/1978 | Fed. Rep. of Germany . |
| 1588791 | 3/1970 | France . |
| 1550633 | 8/1979 | United Kingdom . |
| 2098280 | 11/1982 | United Kingdom . |

OTHER PUBLICATIONS

Abstracts of New Technology (from the Air Force Systems Command); PB81-970485, 80-287, "2D/CD Nozzle with Cavity Pressure Control".

Primary Examiner—Andres Kashnikow
Assistant Examiner—Karen B. Merritt
Attorney, Agent, or Firm—Evenson, Wands, Edwards, Lenahan & McKeown

[57] ABSTRACT

A propelling nozzle has upper and lower primary and secondary flaps which are disposed opposite one another at a mutual distance and which are sealingly movably guided between lateral wall portions of a four-cornered nozzle housing. The primary flaps are arranged pivotally about a fixed axis of rotation on the nozzle housing. The secondary flaps, in each case upstream of levers non-rotatably connected with the primary flaps, are pivotally linked to pivots situated on the side facing away from the nozzle flow. The secondary flaps change into the primary flaps with a surface section which is bent concentrically with respect to the pivots. The primary and secondary flaps are arranged in a four-cornered nozzle housing which is itself closed in. In each case the secondary flaps are arranged on the nozzle housing in an axially movable and angularly adjustable manner at the downstream end. The levers are formed on interior sections which are bent away from the primary flaps in a toggle-lever-type manner. At the rearward ends of the levers, pivots are located. The levers have cutouts which are concentric with respect to the pivots. The surface sections of the secondary flaps can be moved into the cutouts. The upper and the lower primary and secondary flaps can be swivelled by means of their respective separate adjusting system. Each adjusting system is arranged between an upper or a lower wall portion of the nozzle housing and the flaps and, in the process, acts upon a primary or a secondary flap.

19 Claims, 10 Drawing Sheets

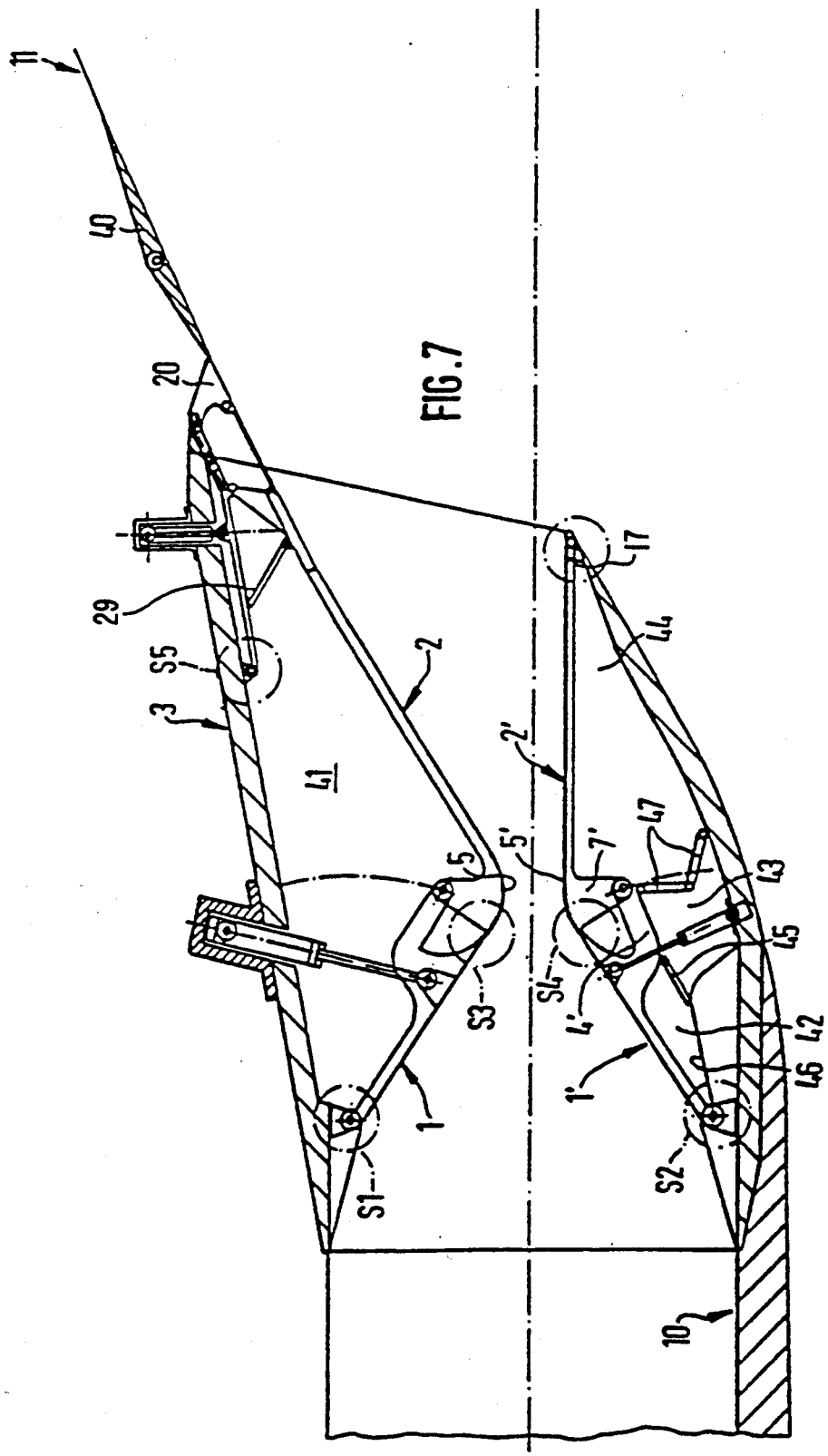

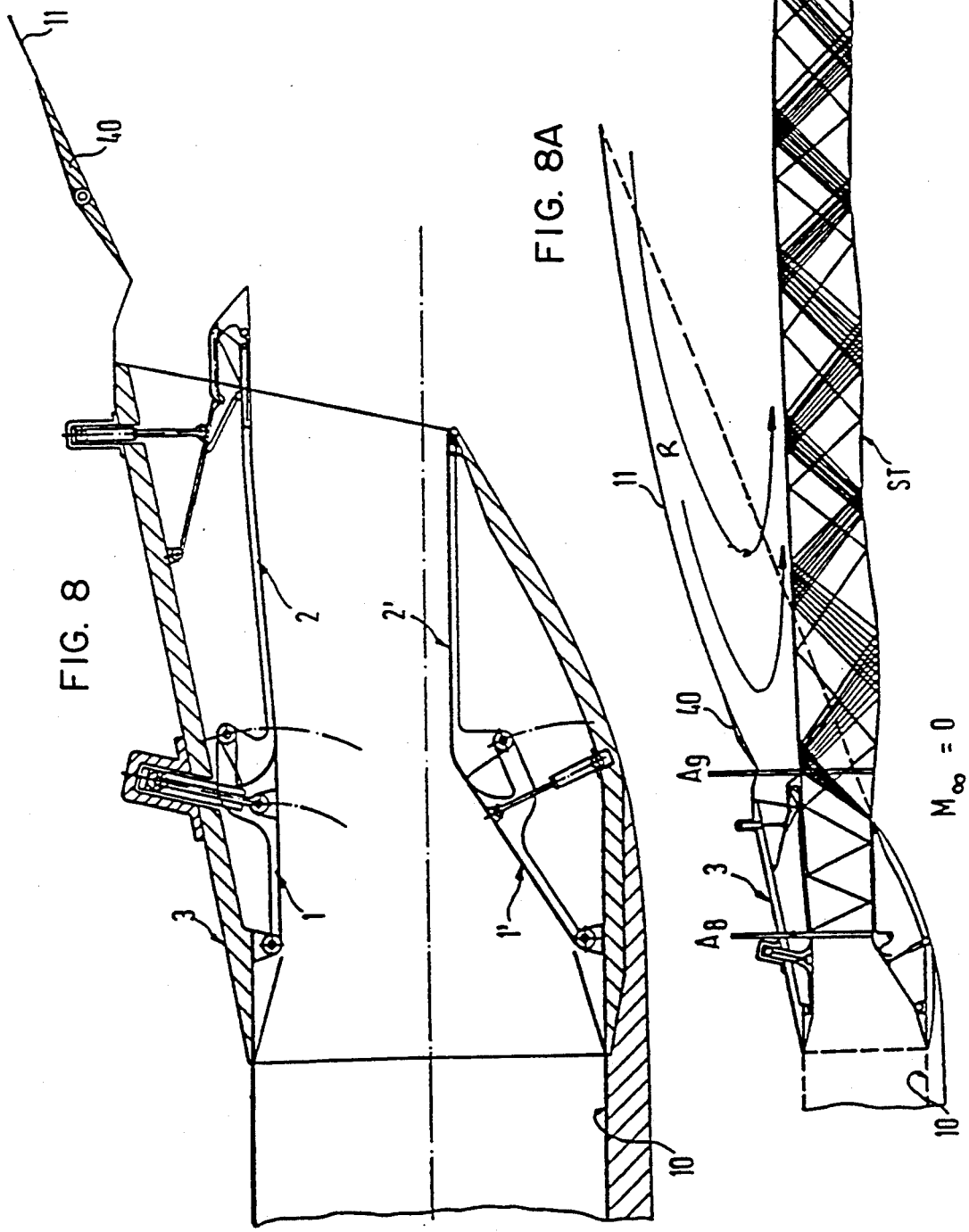

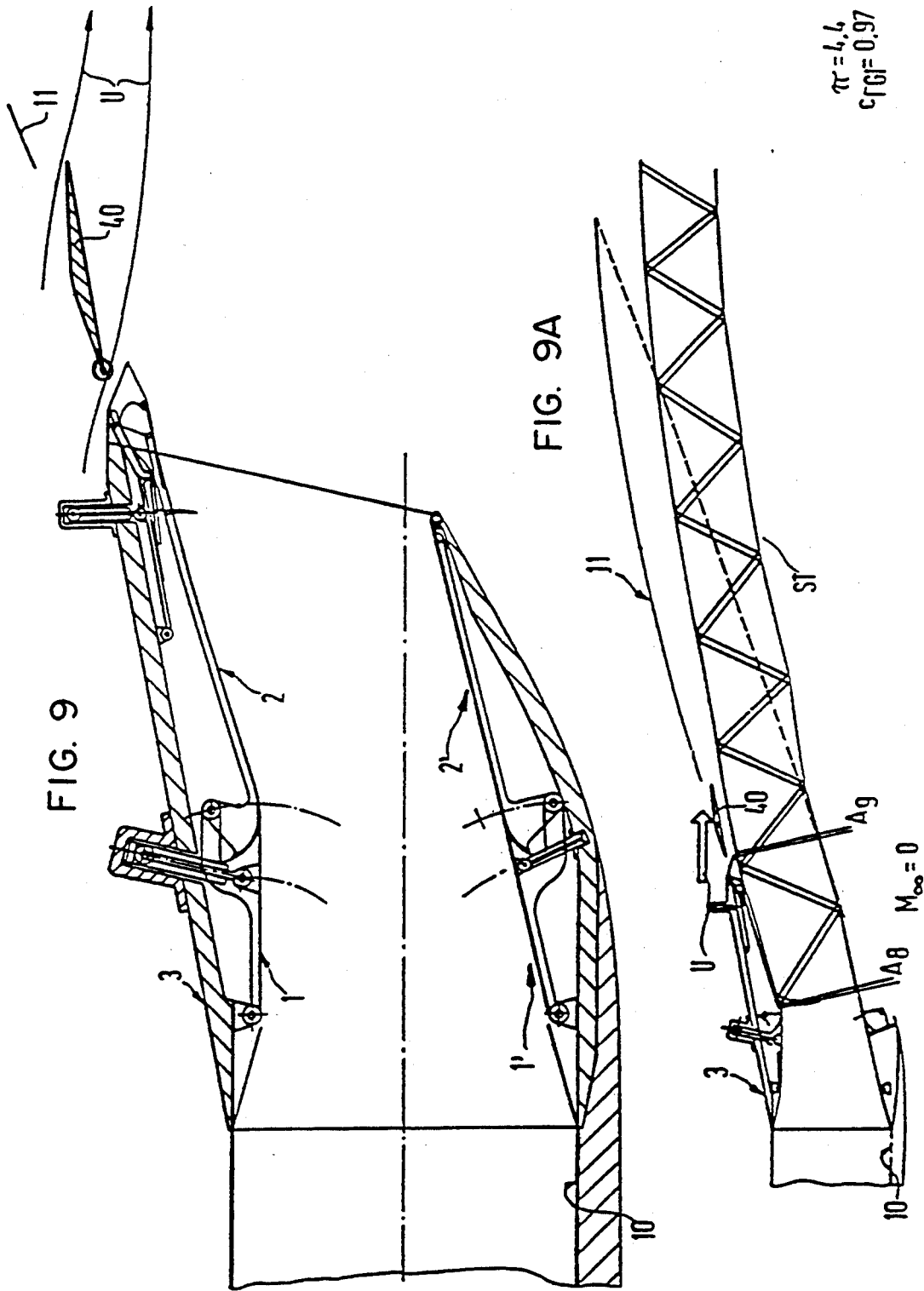

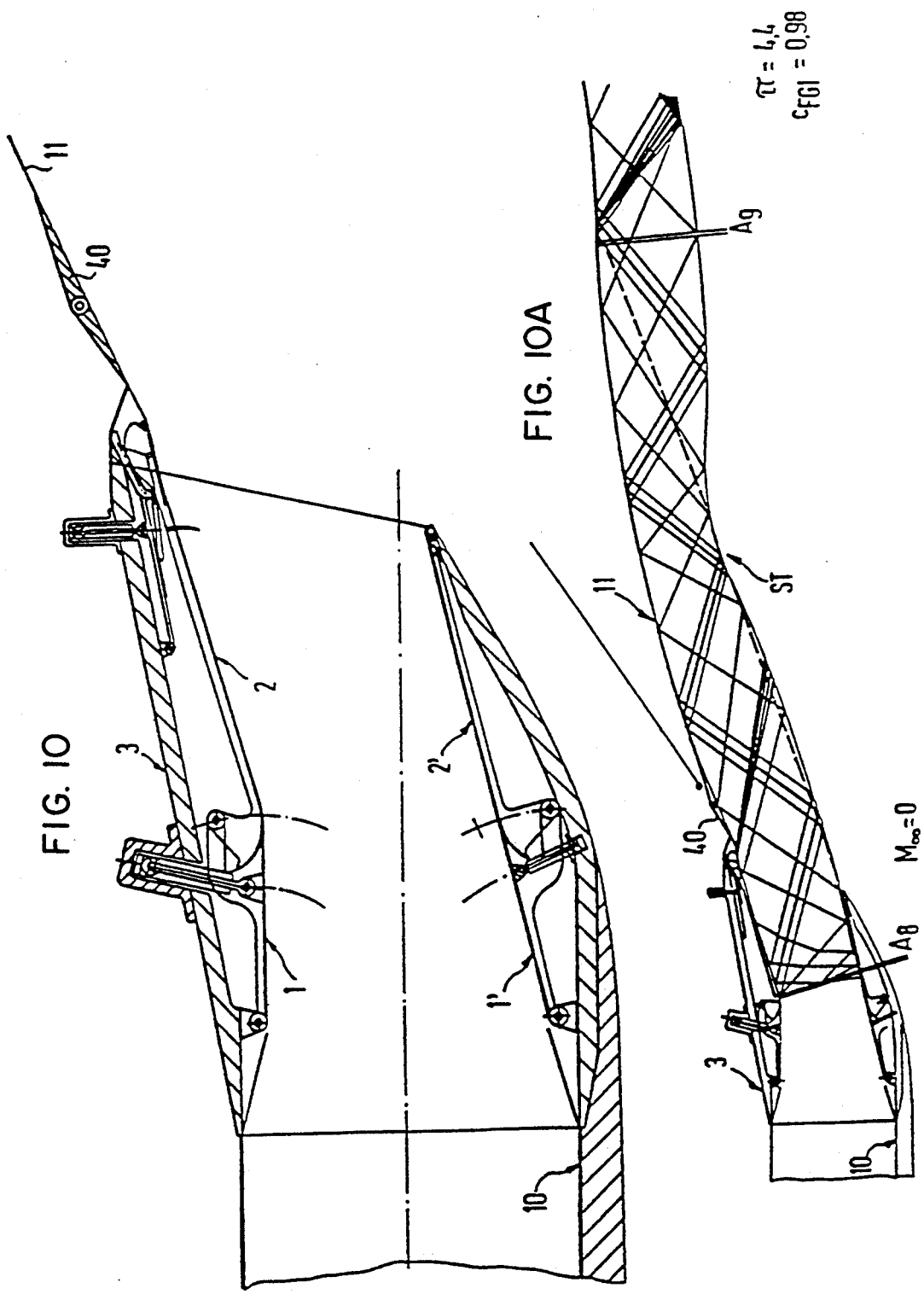

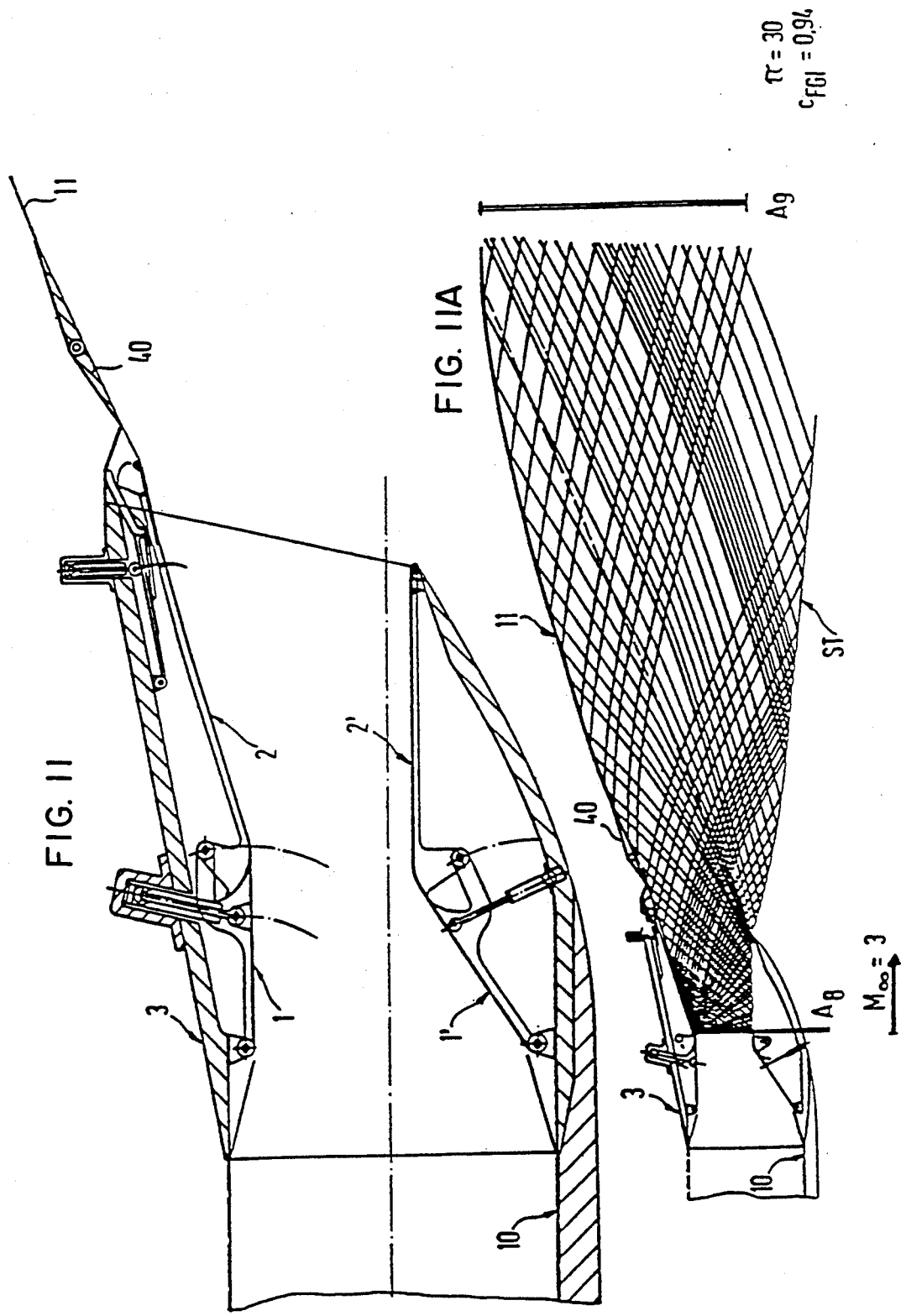

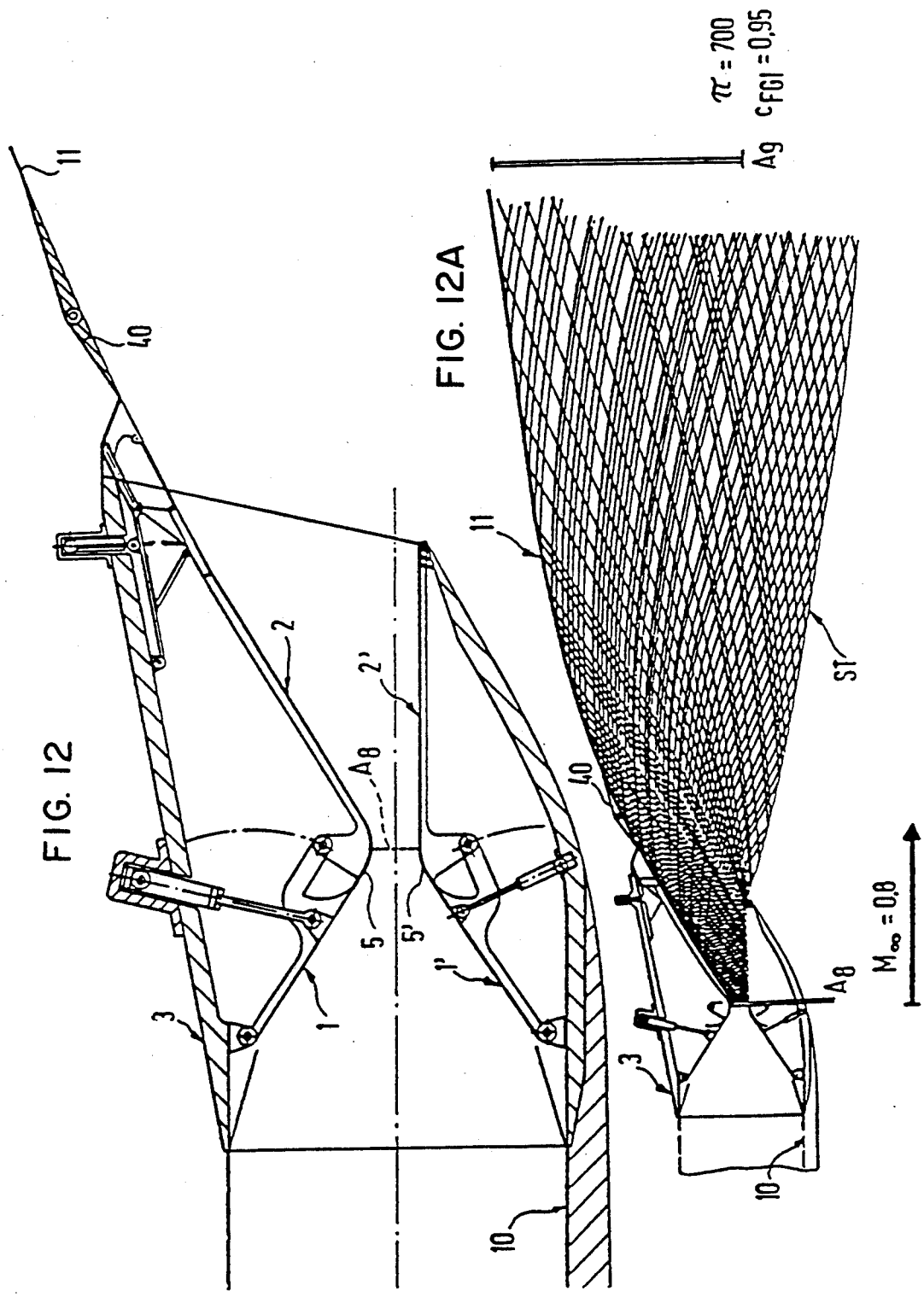

1

PROPELLING NOZZLE

BACKGROUND AND SUMMARY OF THE INVENTION

The invention relates to a propelling nozzle and, more particularly, to a propelling nozzle having a variable course of the nozzle contour for flight aggregates operated in the subsonic, supersonic and hypersonic range.

The nozzle has upper and lower primary and secondary flaps which are disposed opposite one another at a mutual distance and which are sealingly movably guided between lateral wall portions of a four-cornered nozzle housing. The primary flaps are arranged pivotally about a fixed axis of rotation on the nozzle housing. The secondary flaps, in each case upstream of levers non-rotatably connected with the primary flaps, are pivotally linked to pivots situated on the side facing away from the nozzle flow. The secondary flaps change into the primary flaps with a surface section which is bent concentrically with respect to the pivots. The propelling nozzle is arranged between the jet pipe of a turboramjet engine and a radially exterior expansion ramp of the flight aggregate.

Recently, combined turboramjet engines, among others, have regained importance, specifically within the scope of so-called "hypersonic flight concepts" having a extremely high spectrum of application from the start to the high supersonic speed at high flight altitudes, e.g. up to an altitude of approximately 30 km. In this case the "hypersonic flight concepts" includes among other things a space flight aggregate concept, i.e. the "Sänger" Project which amounts to a two-stage concept, as described in the following. The first stage is to be carried out by a flight aggregate operating only within the atmosphere, while the second stage is based on a useful-load flight aggregate which is taken along "piggyback" by the mentioned flight aggregate and which, for the purpose of space mission, in the upper range of the atmosphere, by means of a suitable rocket propulsion system, is to independently continue on the flight path assigned to it. The flight aggregate responsible for the first stage can therefore return and be reused. The flight aggregate carries out starts and landings like a conventional airplane.

In the case of combined turboramjet engines which are to be used, for example, for a flight aggregate of this type, generally, when a flying speed of approximately Mach 3 is reached, the turbojet engine is to be switched off continuously, and the respective ramjet propulsion is to be switched on continuously. Thus, by means of the ramjet propulsion alone, desired high supersonic or hypersonic speeds are reached of up to Mach 4.5 or even more. Flying speeds of approximately Mach 2 or even more may be achieved in this case in the combined operation of "jet engine with a switched-on afterburner". The afterburner, which for this purpose is advantageously connected behind the jet engine part, is possibly acted upon by a combination of compressor or fan air and engine exhaust gas. The afterburner, by means of the connection of additional fuel injection devices together with flame stabilizers, may form the propulsion system for the ramjet operation, with a correspondingly proportioned exclusive ambient-air supply when the turbojet engine part is switched off.

In view of the above-mentioned extremely different flying, performance and ambient conditions, it is difficult to provide a propelling nozzle configuration by means of which essentially the following criteria must be brought into accord economically and optimally with respect to performance.

First, adaptation of the nozzle throat cross-section area (narrowest cross-section) to given, possibly extremely variable mass flows in the case of a flow Mach number $(M\sim)=1$ which can be adjusted in the plane of cross-section of the nozzle throat. This measure is necessary in the case of variable mass flows in order to always ensure the formation of a supersonic flow in the expansion part of the propelling nozzle.

Second, losses of flow energy or aerodynamic losses, as a result of the nozzle adjustment, must be kept low. The required variability of the nozzle contour course must be designed such that it will cause no compression surges in the supersonic flow.

Third, particularly in view of the extremely different flight altitudes, the course of the nozzle flow, and thus the nozzle outlet pressure, should be adaptable to the respective existing ambient condition (ambient pressure) in a manner that is optimal with respect to the propulsion.

Fourth, adjusting devices must be as few as possible—as well as energy expenditures for the required variations of the contour course of the propelling nozzle that are as low as possible.

The propelling nozzle concepts already suggested cannot, or only in an extremely insufficient manner, meet, in particular, the demands of an adaptation with lower flow energy losses to an extremely varying spectrum of ambient pressures in combination with an extremely high variation of the nozzle throat cross-section (narrowest cross-section variation up to 1:5 or even more).

In this context, reference should be made, for example, to a propelling nozzle concept which consists of an axially displaceable mushroom-shaped central body. The central body is axially symmetrically connected in the axial direction behind the afterburning and supplementary burning device of the combined turboramjet engine. In this case, the central body must be movable with respect to a cylindrical, stationary, convergently/divergently extending outer contour of the nozzle. The central body represents an aerodynamic interference body which is extremely thermally stressed and endangered by burn-up. A 'free' hot-gas mass flow, which is required in view of the afterburning and supplementary burning (ramjet operation), cannot be ensured in this manner.

A comparatively complex flap-type double propelling nozzle concept has also been suggested with a view to an engine concept in which a ramjet combustion chamber which has its own propelling nozzle and can be connected separately is to be arranged above a disconnectable jet engine unit with an afterburner. A combined propelling-nozzle adjusting requirement, among others, in the case of only one nozzle, is not met in this case for the subsonic, supersonic and hypersonic operation. The latter also applies in connection with a propelling nozzle known from the German Patent Document DE-OS 31 21 653 in which, between straight walls which project axially on the side of the engine cell and are open laterally on the top and bottom, primary flaps are provided which can be swivelled around transverse axes and, at the extreme ends of which, unsupported secondary flaps, which can be swivelled about additional axes of rotation, form the respective divergent end part of the nozzle. The primary flaps which, in this case are opposite one another, essentially jointly form the convergent nozzle contour course including the respectively narrowest point (throat cross-section). In this case, among other things, special covering flaps are required which, on the exterior, must extend over the respective primary and secondary flap pairs, for the purpose of guiding ambient air which, if possible, should be aerodynamically surface-covering. In addition, by means of the variable swivelling capacity of the nozzle flaps, an exhaust gas shut-off should be possible within limits by means of the essentially axially symmetrical surface-covering contacting of the secondary flaps (thrust reversal operation) or a propulsion jet swivelling should be possible in a perpendicular plane. In addition, the primary and secondary flaps, by way of torsion waves—guided through the nozzle side walls—are to be adjusted. This adjusting requires laterally projecting aerodynamically unfavorable adjusting device application points and arrangements. In addition, in the known case, each primary and secondary flap of the propelling nozzle requires a separate adjusting drive. Because of the adjusting kinematics selected in the known case, it should also be difficult to be able to control, in an operationally safe manner, the gas forces affecting the primary and secondary flaps. This is true particularly in relation to the outside ambient pressure conditions.

U.S. Pat. No. 2,889,576 relates to a propelling nozzle for gas turbine jet engines having upper and lower primary and secondary nozzle flaps between lateral wall portions of a nozzle housing. The nozzle is constructed to be open on the top and on the bottom and has a variable nozzle contour (convergence, divergence or narrowest cross-section). The adjustment of the nozzle flaps takes place in interaction with respective radially outside upper and lower covering flaps. In adaptation to given mechanical variations of the convergent/divergent interior contour and of the narrowest cross-section, the covering flaps are spoilers which can be moved against the outside air flow. The lever adjusting kinematics and arrangement must mainly be constructed in such a manner that despite the differently adjusted nozzle divergence or divergence/convergence and deviating narrowest cross-section (prolate flap position, narrowest cross-section and outlet cross-section maximally opened), the covering flaps form a housing closure which, if possible, should be connected with low aerodynamic losses. In the known case, the primary flaps form, at the same time, thin covering elements of levers which are arranged at a radial distance to the levers and can be swivelled with the levers. The levers and the primary flaps can be swivelled by means of a separate adjusting drive by way of a front pivot on a radially upper part of the nozzle housing in order to adjust the respective narrowest cross-section by means of the primary flaps (convergent nozzle part). When the narrowest cross-section is adjusted, the nozzle divergence should then be separately adjustable by means of the secondary flaps starting from the covering flaps. In this case, the covering flaps can be swivelled by means of a separate adjusting drive about the pivot of the levers. In addition, by means of movably coupled intermediate levers, the covering flaps are longitudinally slidably and angularly adjustably coupled with the secondary flap end. By means of a flap end, which is symmetrically curved upstream toward an interior pivot, the secondary flaps are pivotally linked to the downstream ends of the levers and, from case to case, can be more or less moved into the primary flaps. A telescope-type spring-supported lever arrangement is provided between the interior pivot and the respective rear intermediate lever. A pivoted lever, which is supported on the housing side—in the vicinity of the pivot—acts upon the forward intermediate lever in an articulated manner.

The known propelling nozzles have several important disadvantages. These include high flap adjusting expenditures, particularly with respect to a combined nozzle/spoiler adjustment; predominantly one-sided flap support on the housing; special closing requirements of the nozzle housing, on the bottom as well as on the top; unstable housing construction, that is, the housing does not form a "pressure vessel" that is itself closed in so that considerable difficulties exist with respect to the establishment of a flap arrangement that is relieved from pressure; the extremely small throat cross-section and the relatively large expansion angle (secondary flaps in the case of a pronounced convergence) involve an exposure of the housing and a braking position ("spoiler"); a double adjusting drive is required for each set of primary and secondary flaps; the adjusting drive takes place laterally of the nozzle housing which, among other things, has an unfavorable influence on a structural arrangement of several engines together with the propelling nozzles next to one another that is densely crowded in the transverse direction; lateral weakening of the housing (adjusting drive); downstream ends of the primary flaps define the respective narrowest cross-section of the nozzle with an aerodynamically disadvantageous extreme edge overhang: with respect to stability, there is no clear "lever/primary flap" connection.

The British Patent Document GB-A 2098 280 relates to a two-dimensional convergent/divergent propelling nozzle for gas turbine engines which is variable with respect to its effective nozzle surface. The convergent/divergent nozzle, which is arranged in a four-cornered exhaust gas housing, consists of upper forward and rearward flaps, which interact with stationary upper and lower wall portions in the housing and are pivotally linked to one another. The nozzle also consists of a lower single flap which, on the interior side, is shaped convergently/divergently. In a combination of an axial displacement of the single flap, which takes place in the shape of a circular arc, and a buckling motion of the upper flaps, which takes place relative to it or to the nozzle axis, the interior contour of the nozzle can be varied with respect to the local axial displacement and change of the narrowest cross-section. In this case, the upper forward flap can be moved at the forward end, or both upper flaps can be moved at a joint pivotal linking point along curved guideways on the housing. In combination with a deflecting scoop for the jet deflection (vertical take-off or short take-off), which moves out downstream, together with an unfoldable fork, the smallest narrow surface of the nozzle must be formed between the maximally moved-out single flap (bottom) and the scoop. Separate driving devices are, in each case, assigned to the scoop, the two upper flaps and the single flap. In a variable nozzle end position, without jet deflection, the inner part of the unfoldable fork always forms an expansion section which geometrically continues the rearward upper flap.

From the British Patent Document GB-A-15 50 633, a combination is known of a convergently/divergently adjustable propelling nozzle with a jet reversing hood which can be moved downstream into the gas flow. The propelling nozzle consists of upper primary and secondary flaps which, on the housing of the combined device, engage in one another in a fork-shaped manner which compensates the adjusting path. The nozzle also consists of a radially downward flap which can be swivelled about a single axis of rotation. At the downstream upper end of the propelling nozzle, a control flap is provided for controlling the nozzle expansion angle or for influencing the flow-off direction of the propelling jet. The known case mainly relates to a supplying of cooling air to the propelling nozzle controlled by way of valves in a targeted manner. The cooling air is supplied in such a manner that a requirement-oriented cooling air supply should be possible while ensuring the local pressure differences for the supply (such as impact cooling) particularly in view of an optional cruise or V/STOL flight operation and the resulting pressure fluctuations in the exhaust gas jet. In the known case, a single pressure chamber for the fed cooling air is provided between the primary and secondary flaps and an arc-type exterior part of the nozzle housing. By way of openings, this chamber must be connected with cooling ducts integrated on the housing side.

This known case does not show any supply of boundary-layer air which is controlled by flaps—between the nozzle outlet and a stationary expansion ramp at the rear of the flight aggregate—for the purpose of an aerodynamic bounding of the propelling jet.

From U.S. Pat. No. 2,995,010, it is known to swivel, in the case of a propelling nozzle for gas turbine jet engines, the respective primary flaps by means of adjusting cylinders which act upon the flaps in the transverse direction, in an adaptation to the required nozzle convergence and the narrowest throat cross section. The adjusting cylinders, being pivotable at the extreme end, are anchored on an exterior supporting structure. In addition, the known case always requires a special adjusting lever control which is coordinated by way of a two-fold drive or a two-fold driven, mutually superimposed adjusting movement of the primary and secondary flaps and while applying an elastically deformable covering ring as the sealing device on the respective narrowest or buckling point between the two flap sets.

The French Patent Document FR-A-1588791 provides a secondary propelling nozzle which consists of flap elements which end in a wedge-shaped point. The flap elements can be moved axially and can be swivelled about transverse axes. The nozzle, in the case of a convergently/divergently adjusted nozzle contour course, by way of primary and secondary flaps, expanding in a ramp shape by means of the radially interior wedge surfaces, essentially connects to the downstream ends of the secondary flaps.

The PB 81-979485 reference shows a valve which is controlled via a locally measured pressure difference (sensor) information by way of an electronic engine control. The valve has the purpose of controlling the supply and the pressure of compressed air taken from the cyclic process in or into a pressure chamber which is constructed between interior flap structures (primary and secondary flaps) and exterior housing structures.

A multi-chamber system which is adapted to the locally graduated pressure course of the hot gas flow, with existing blocking-air differential pressures which are locally adapted with respect to the hot-gas flow at the most sensitive points (movable seals) is not shown in the mentioned case.

There is therefore needed a propelling nozzle which, as a supersonic expansion nozzle, makes it possible to achieve an aerodynamically advantageous adjustment of the nozzle throat cross-sectional surface over a wide operating range, without causing compression surges, in which case, the nozzle flow is to be adapted to a large ambient pressure rang (extremely different flight altitudes) in a propulsion-optimal manner.

These needs are met by the propelling nozzle according to the present invention having a variable course of the nozzle contour for flight aggregates operated in the subsonic, supersonic and hypersonic range. The nozzle has upper and lower primary and secondary flaps which are disposed opposite one another at a mutual distance and which are sealingly movably guided between lateral wall portions of a four-cornered nozzle housing. The primary flaps are arranged pivotally about a fixed axis of rotation on the nozzle housing. The secondary flaps, in each case upstream of levers non-rotatably connected with the primary flaps, are pivotally linked to pivots situated on the side facing away from the nozzle flow. The secondary flaps change into the primary flaps with a surface section which is bent concentrically with respect to the pivots. The propelling nozzle is arranged between the jet pipe of a turboramjet engine and a radially exterior expansion ramp of the flight aggregate. The primary and secondary flaps are arranged in a four-cornered nozzle housing which is itself closed in. In each case the secondary flaps are arranged on the nozzle housing in an axially movable and angularly adjustable manner at the downstream end. The levers are formed on interior sections which are bent away from the primary flaps in a toggle-lever-type manner. At the rearward ends of the levers, pivots are located. The levers have cutouts which are concentric with respect to the pivots. The surface sections of the secondary flaps can be moved into the cutouts. The upper and the lower primary and secondary flaps can be swivelled by means of their respective separate adjusting system. Each adjusting system is arranged between an upper or a lower wall portion of the nozzle housing and the flaps and, in the process, acts upon a primary or a secondary flap.

Other objects, advantages and novel features of the present invention will become apparent from the following detailed description of the invention when considered in conjunction with the accompanying drawings.

BRIEF DESCRIPTION OF THE DRAWINGS

FIG. 7 is a longitudinal, sectional, center view of the propelling nozzle of FIG. 1 in a different flight configuration.

FIG. 8 is a longitudinal, sectional, center view of the propelling nozzle of FIG. 1.

FIG. 8a is a longitudinal, sectional view of the propelling nozzle of FIG. 8 showing the nozzle throat cross-sectional and outlet surfaces.

FIG. 9 is a longitudinal, sectional, center view of the propelling nozzle of FIG. 1 in a different configuration.

FIG. 9a is a longitudinal, sectional, center view of the propelling nozzle of FIG. 9.

FIG. 10 is a longitudinal, sectional, center view of the propelling nozzle of FIG. 1 in a different configuration.

FIG. 10a is a longitudinal, sectional, center view of the propelling nozzle of FIG. 10.

FIG. 11 is a longitudinal, sectional, center view of the propelling nozzle of FIG. 1 in a different configuration.

FIG. 11a is a longitudinal, sectional, center view of the propelling nozzle of FIG. 11.

FIG. 12 is a longitudinal, sectional, center view of the propelling nozzle of FIG. 1 in a different configuration.

FIG. 12a is a longitudinal, sectional, center view of the propelling nozzle of FIG. 12.

DETAILED DESCRIPTION OF THE DRAWINGS

Figure 1:
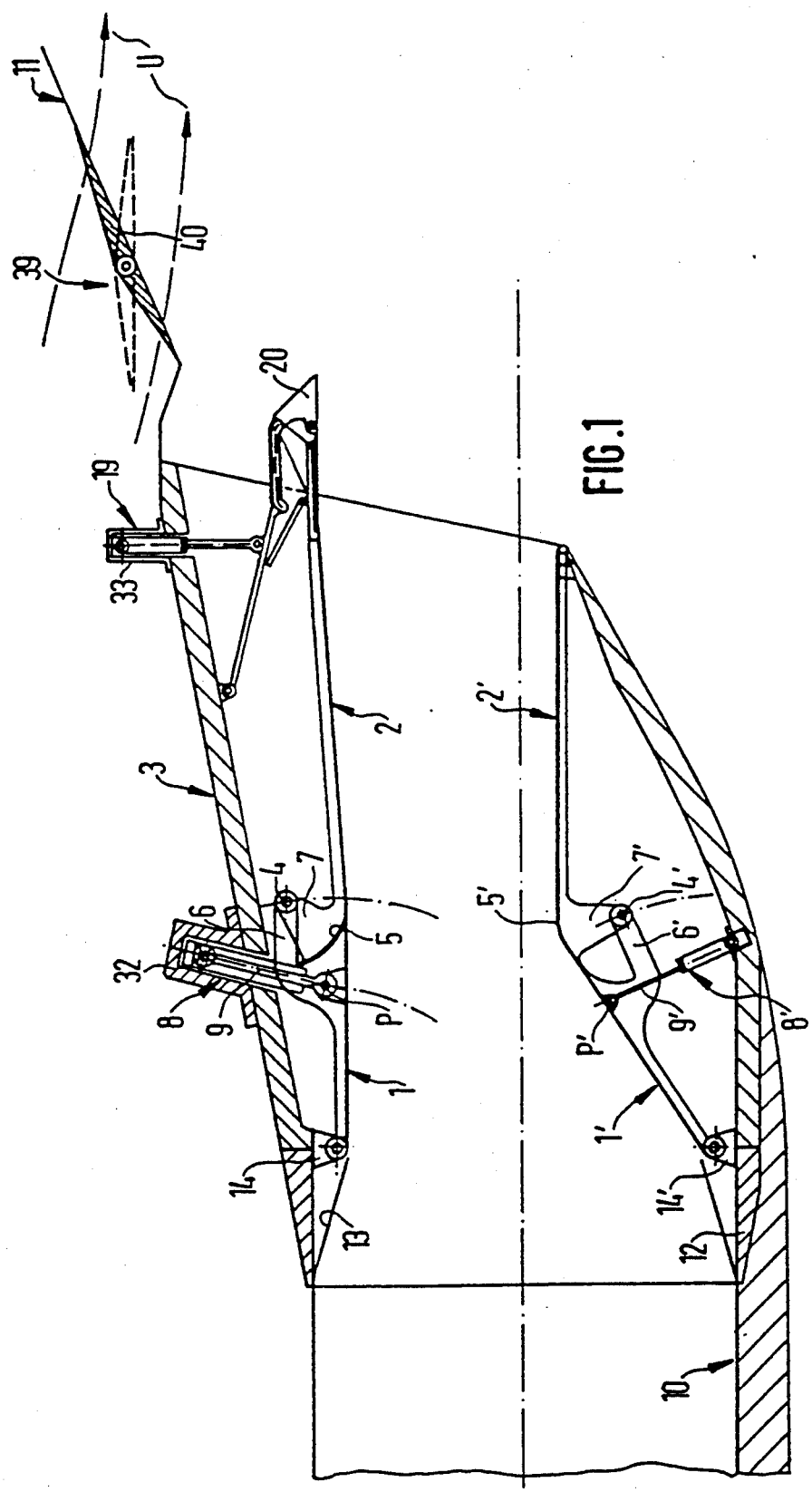
FIG. 1 is a longitudinal, sectional, center view of a propelling nozzle.

FIG. 1 is a longitudinal sectional center view of a propelling nozzle which is connected to an engine, particularly a combined turboramjet engine being in the nozzle position for the case of a start without any afterburner operation. This is therefore a propelling nozzle for variable hot-gas mass flows under particularly extremely varying ambient pressure conditions, particularly a supersonic expansion nozzle which is extremely well suited for variable applications, such as the subsonic, supersonic as well as hypersonic speed range of flight aggregates, according to the criteria which were outlined initially in the manner of examples.

In the case of this propelling nozzle, the variable nozzle contour course is to be formed between the respective upper and lower primary and secondary flaps 1, 2; 1', 2' which are to be sealingly movingly guided on parallel wall surfaces of a four-cornered nozzle housing 3. In practice, a propelling nozzle of this type is generally also called a so-called "rectangle propelling nozzle". In the case of the propelling nozzle according to the invention, the primary flaps 1, 1' are, in each case, pivotally linked upstream. The secondary flaps 2, 2' are in each case pivotally linked downstream on the nozzle housing 3, in this case, at the top or at the bottom. More precisely, the primary flaps 1, 1' are therefore pivotally suspended at the nozzle housing 3 by way of stationary pivots. The secondary flaps 2, 2' are each, at their downstream ends, in a manner which will be explained below, suspended or pivotally linked on the nozzle housing so that they can be moved and the angle can be adjusted. As also shown in FIG. 1, the secondary flaps 2, 2' must also be pivotally linked to pivots 4, 4' of the primary flaps 1, 1' situated on the side facing away from the nozzle flow, and, by means of sections 5, 5' which are essentially concentric with respect to these pivots 4, 4', must be arranged so that they can in an aerodynamically surface-covering manner move into the primary flaps 1, 1' or out of them.

In addition, in the case of the above-indicated and described propelling nozzle, the mentioned pivots 4, 4' must in each case be arranged on the rearward ends of interior sections 6, 6' of the primary flaps 1, 1', which are bent away in a toggle-lever-shaped manner. The interior sections 6, 6' must be cut out concentrically with respect to the respective pivots 4, 4'.

As also shown in FIG. 1, among other things, the secondary flaps 2, 2', by means of the rounded surface sections 5, 5' of projecting wall sections 7, 7' or brackets, which form, on the upstream end a more or less arched nozzle surface constriction, must be suspended at the primary flaps 1, 1' so that they can be swivelled together with the latter.

FIG. 1 also shows that the propelling nozzle must be arranged between a tube configuration of the combined turboramjet engine containing an afterburner. The engine may also possibly contain a supplementary burner device (ramjet propulsion) and an exterior expansion ramp 11 (rear side) integrated on the flight aggregate side.

In this case, according to FIG. 1, the propelling nozzle has an inlet section 12 which forms a transition part to the nozzle which reconfigurates the cylindrical tube configuration 10 of the engine into a square or rectangular cross-section. The mentioned transition part 12 may have a heat-shield-type insert 13 which, in the direction of the flow, is convergent preferably on the top and on the bottom and which, while locally shielding the upstream suspension devices 14, 14' of the respective upper and lower primary flaps 1, 1', tapers out in the direction of their forward front or inlet edges.

Preferably, the upper and the lower primary and secondary flaps 1, 2 and 1', 2', according to the invention, can each be swivelled independently of one another by their own adjusting system 8, 8'.

According to FIG. 1, each adjusting system 8, 8' acts pivotally on a respective primary flap 1, 1'. However, it would also definitely be conceivable to have the corresponding adjusting systems 8, 8' act only upon the respective secondary flaps 2, 2'.

FIG. 1 also shows that the respective adjusting systems 8, 8' may be arranged between an upper or lower section of the nozzle housing 3 and the respective upper and lower primary and secondary flaps 1, 1' and 2, 2'.

The above-mentioned adjusting systems 8, 8' may be formed by hydraulically or pneumatically actuated adjusting cylinders which are arranged in the transverse direction on the upper or on the lower section of the nozzle housing 3. The piston rods or lifting-connection rods 9, 9' of the adjusting systems, for example, according to FIG. 1, on the end side, in the form of a pivot (P, P'), act upon downstream parts of the respective primary flaps 1, 1'.

According to the invention, it may also be provided that the nozzle housing 3 in the upper area, from the inlet side to the nozzle outlet side, is to extend in a sloped manner, approximately in an adaptation with respect to the direction to the transition to the above-mentioned expansion ramp 11. In the lower area, the nozzle housing extends from the inlet side, first, essentially with a straight wall and in parallel with the nozzle axis, and then, arched or curved-in, from the exterior bottom to the interior top in the direction of the nozzle outlet. In this case, the nozzle housing 3 therefore forms a component of the rear of the airplane disposed on the bottom rear.

According to the invention, the lower and/or upper secondary flaps 2', 2 may also be arranged on the nozzle housing 3 on their downstream ends so that their angle can be adjusted and they can be moved.

Figure 2:
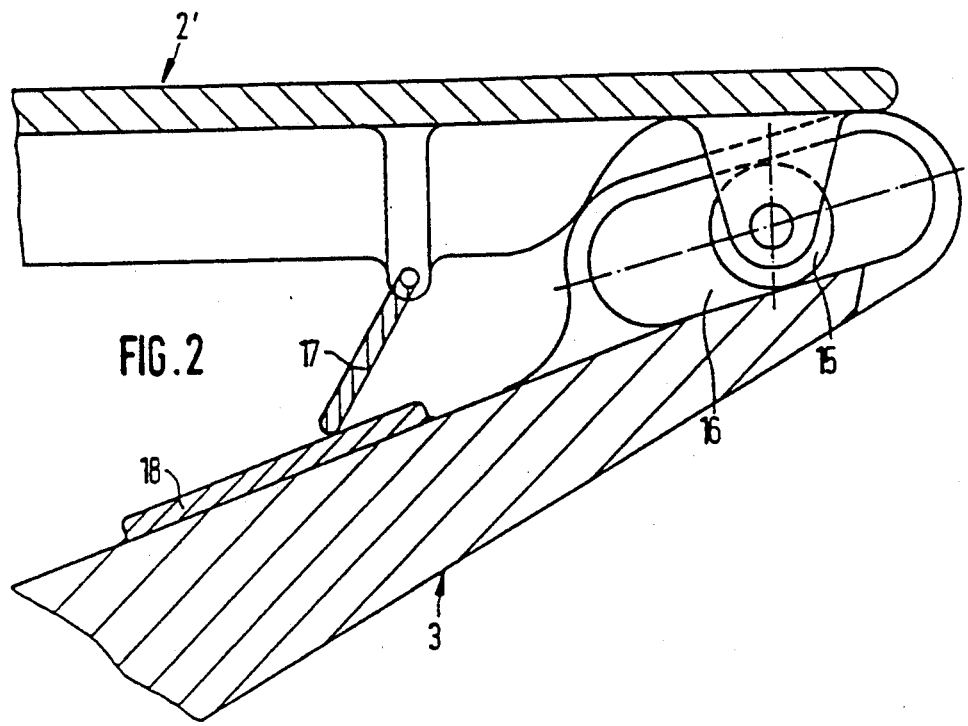
FIG. 2 is a longitudinal, sectional view of part of the secondary flaps in FIG. 1.
Figure 3:
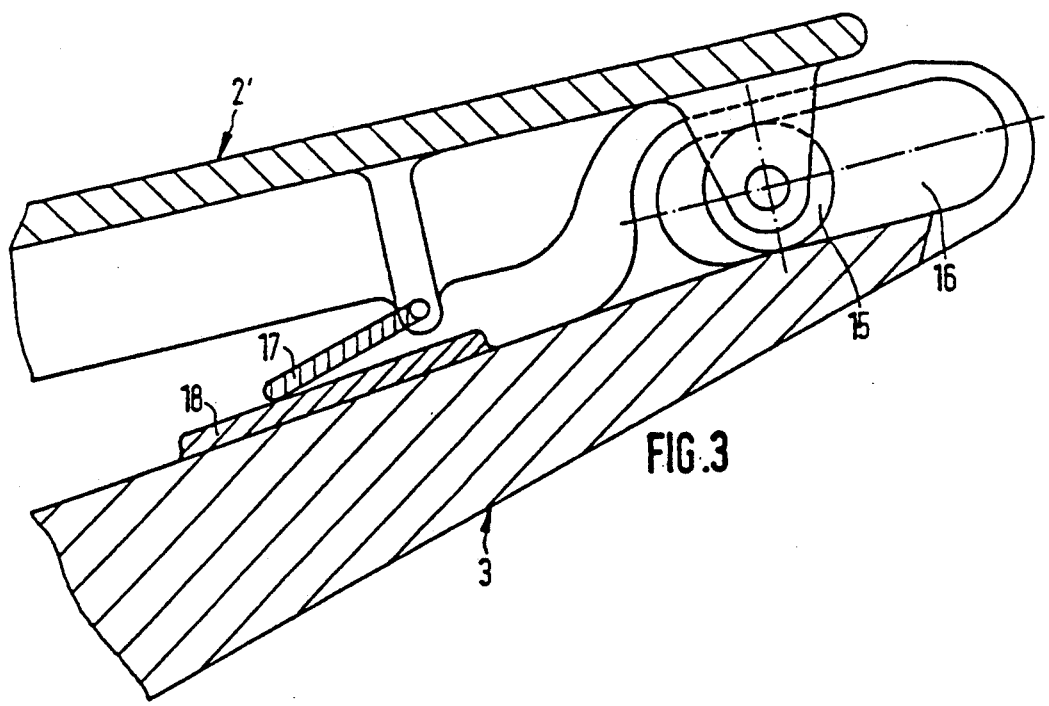
FIG. 3 is a longitudinal, sectional view of the secondary flaps of FIG. 2 in a different position.

As longitudinal center sections from FIG. 1, which are each shown in a broken-off manner, FIGS. 2 and 3 represent the above-mentioned characteristic of the invention with respect to the angular adjustability and the movability on the nozzle housing, here with respect to the lower secondary flaps 2'. FIGS. 2 and 3 illustrate that the lower secondary flaps 2', by means of rollers 15 situated on their downstream ends, are arranged in connecting-link-type guideways 16 of the lower nozzle housing 3 so that they can be angularly adjusted and moved in this case.

As also shown in FIGS. 2 and 3, a sealing plate 17 is to be movably arranged on the lower secondary flap 2', outlined here as an example, in front of the mentioned connecting-link-type guideway 16. The sealing plate 17, with its extreme free end, can be swivelled in with respect to a seal rest 18 fixed to the housing and can be moved in the seal rest 18.

Figure 4:
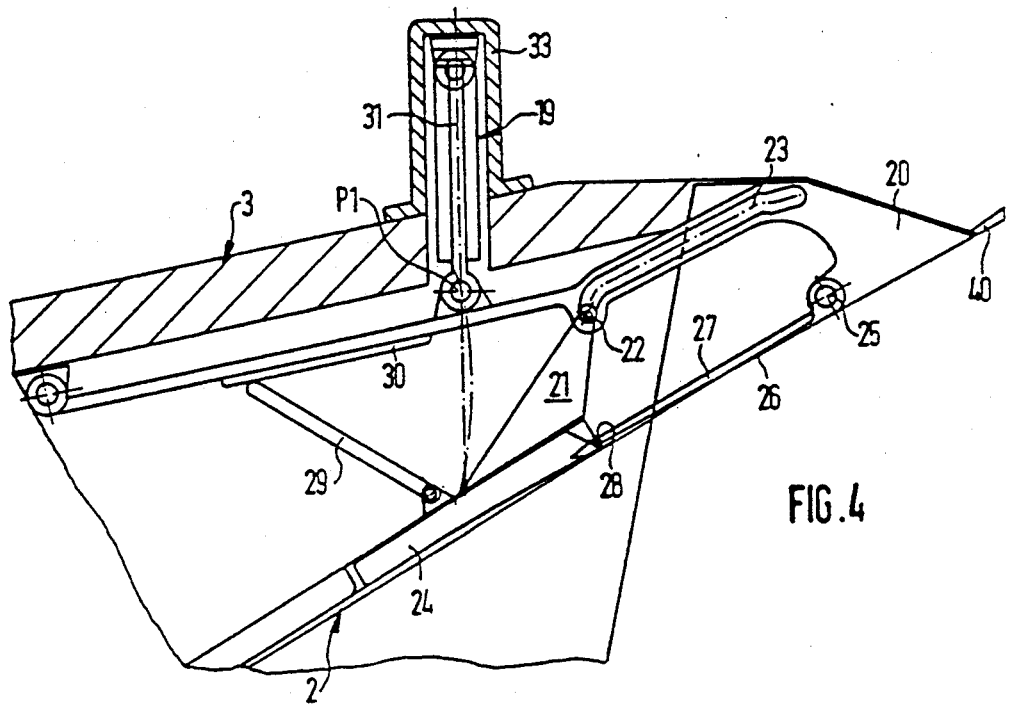
FIG. 4 is a longitudinal, sectional view of another part of the secondary flaps in FIG. 1.
Figure 5:
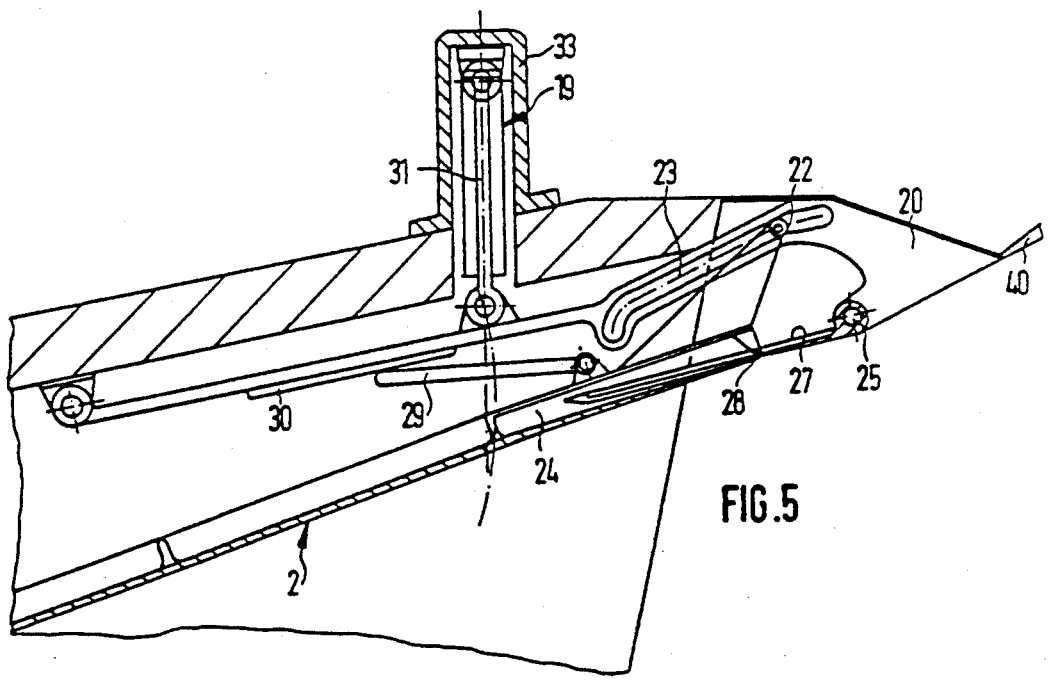
FIG. 5 is a longitudinal, sectional view of the secondary flaps of FIG. 4 in a different position.

FIGS. 4 and 5 each outline, as longitudinal center cutouts, other propelling nozzle sections of FIG. 1, specifically in this case concerning, for example, a guide housing device 20 which can be angularly adjusted and which compensates axial displacements. In the case of FIGS. 4 and 5, the upper secondary flap 2, at the downstream end, is therefore suspended, in an axially movable and angularly adjustable manner on the already mentioned guide housing 20 which can be actuated by its own adjusting system 19 and is pivotally disposed on the nozzle housing.

In this case, the respective upper secondary flap 2, includes wall-shaped holding devices 21, which project out of the side facing away from the hot gas side. By way of rollers 22, the wall-shaped holding devices 21 engage in a connecting-rod-type guideway 23 of the guide housing 20, specifically so that the secondary flap can be angularly adjusted and moved axially in a movement-compensating manner. Therefore, the guide housing forms a device for compensating adjusting and length changes. For this purpose, in addition, the upper secondary flap 2, on the downstream end, is provided with a recess 24 which is open toward the rear. An auxiliary flap 26, which can be swivelled about an axis 25 below the respective guideway 23 on the guide housing and bridges the free flap end, must be movable increasingly deeper into this recess 24 with an increasing reduction of the expansion angle of the propelling nozzle. The latter is illustrate particularly in FIG. 5, in comparison with FIG. 4.

In the case of the arrangement according to FIG. 4 and 5, the auxiliary flap 26 may also be movably arranged on the side facing away from the hot gas with at least one guideway 27 along rollers 28 held on the rearward end of the open longitudinal recess 24.

FIGS. 4 and 5 also show that the above-mentioned upper secondary flap 2 upstream of the holding devices 21 may have a sealing plate 29 which is pivotally fastened to it. Advantageously, this sealing plate 29, with its extreme end, in a sealing manner, may always be tangent with a sealing-plate-type rest 30 arranged on the guide housing 20, with a restricted guidance which is locally integrated in the rest.

According to FIGS. 4 and 5, an adjusting system 19 may also be provided which is integrated on the housing side. For example, the adjusting system 19 acts movably upon the guide housing 20, specifically in point P1, in the upper section of the housing 3 of the propelling nozzle by means of at least one tension/pressure rod-type adjusting member 31.

As also roughly outlined schematically in FIGS. 1, 4 and 5, according to the invention, the adjusting systems, for example systems 8 or 19, may, at least partially also be disposed in sleeve-type members 32, 33 which are accessible on the outside from the nozzle housing 3 in a manner that is advantageous with respect to servicing, and which are detachably arranged on the housing.

Figure 6:
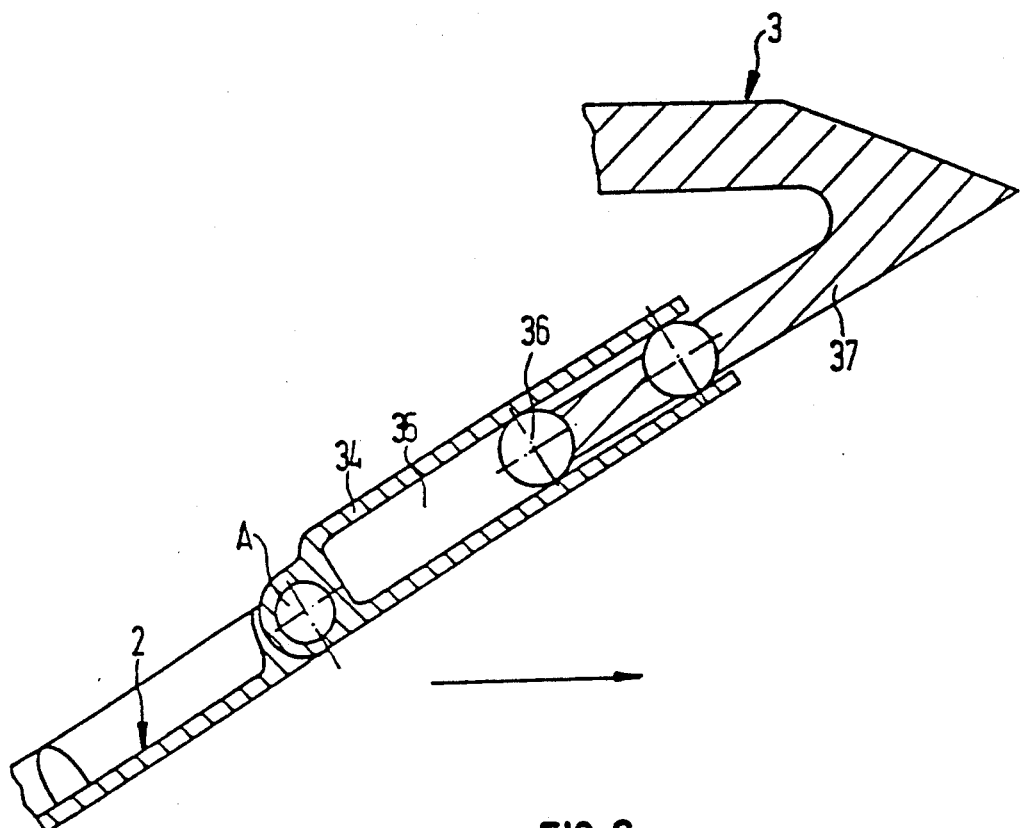
FIG. 6 is a longitudinal, sectional view of another embodiment of FIG. 1.

FIG. 6 represents another auxiliary flap variant, viewed on the top right as a longitudinal-center-type cut-out of the respective nozzle housing 3 with respect to FIG. 1. In this case, the corresponding auxiliary flap 34 is therefore arranged at the end of the upper secondary flap 2 so that it can be rotated about a transverse axis A. In this case, the auxiliary flap 34 is also constructed as a guideway 35 which is open downstream. By means of the guideway 35, the auxiliary flap 34 is to be movable along rollers 36 of a bent-away end part 37 of this end of the nozzle housing 3. In the case of an outer expansion angle adjustment, the auxiliary flap 34 is moved in a manner which compensates adjusting and length changes. With respect to the mentioned embodiment according to FIG. 6, a special adjusting system may be provided which pivotally acts upon the auxiliary flap 34, specifically possibly as a replacement for a flap adjusting system which pivotally acts upon the respective exterior secondary flap 2.

According to the invention as shown in FIG. 1, a blow-in device 39 for supplying an air boundary layer which is taken in, for example, on the engine inlet side, may also be provided between the upper extreme end of the nozzle housing 3 and the expansion ramp 11. As will be explained and illustrated below, such a blowing-in of air may advantageously be used in an operating condition which consists of the connecting of the afterburner during the take-off phase or the take-off/climbing-flight phase. In this manner, there is the possibility of restricting the propelling jet in regard to its outer contour course with respect to the direction of the course of the expansion ramp so that the expansion ramp 11 does not result in significant thrust losses in this mentioned operating phase. In addition, by means of the mentioned blowing-in of an air boundary layer, aerodynamic losses may be reduced which may possibly result from a locally upper hot gas stall at the nozzle. The above-mentioned blowing-in of boundary layer air is shown in FIGS. 1 and 9 by means of arrows U.

As also shown in FIG. 1, the blow-in device 39 consists of flaps 40 which can each be swivelled in the center and about transverse axes. There is also the possibility of providing other flap configurations which would have to be arranged to be pivotable, for example, on the end side (FIG. 9). In a manner not shown in detail, the mentioned flaps 40 may be adjustable by means of one separate driving system respectively. However, the flaps 40 may also be adjustable in synchronization with one or several primary and/or secondary flaps. In addition, the mentioned flaps 40 may be arranged and constructed to be spring-loaded and automatically opening or closing against the static pressure of the nozzle flow.

According to the invention and not shown in detail in the drawings, the respective blow-in device for the air boundary layer may, however, also be constructed to be of a shutter type.

As also not shown in detail in the drawings, there is the possibility of arranging in the longitudinal direction of the expansion ramp 11, an arbitrary number of blow-in devices or means at arbitrarily staggered distances.

According to the invention, the air flow obtained by way of the blow-in device from the air boundary layer may, at least partially, also be used for the cooling of the nozzle, particularly of the flaps.

An advantageous nozzle concept according to the invention is also conceivable in which the upper as well as the lower secondary flap 2, 2' are each suspended axially movably as well as angularly adjustably on the downstream end on guide housings 20 which can be actuated by respective separate adjusting systems and are pivotally disposed on the top and on the bottom on the nozzle housing 3. Thus, the flaps can be suspended on guide housings as they are illustrated according to FIGS. 1, 4 and 5, only with respect to a rearward upper suspending of the secondary flaps 2.

In the nozzle concept according to the invention, it is also advantageous that the primary flaps 1, 1' can be arranged in a fixed manner or may be fixedly adjusted with a swivelling possibility of the secondary flaps 2, 2' which is only joint or independent of one another.

In the case of the above illustrated and described propelling nozzle, a convergently/convergently constructed nozzle contour course with the narrowest nozzle point at the nozzle outlet to a convergent/divergent nozzle with small to very large nozzle throat cross-sections and small to very large divergence ratios can be adjusted This occurs by means of upper and lower primary and secondary flaps 1, 1'; 2, 2' or by means of one, for example, upper set of primary and secondary flaps 1, 2, with only one adjusting system that is responsible for the latter, with a fixedly adjusted or arranged lower set of primary and secondary flaps 1', 2'.

FIG. 7 represents the propelling nozzle shown in FIG. 1, but in this case in a nozzle position for the operation at a comparatively high flight altitude of approximately 30 km (hypersonic flight operation). In this case, the smallest possible nozzle throat cross-section is formed between the rounded surface sections 5 and 5' of the secondary flaps 2 and 2' which are opposite one another.

FIG. 7 also illustrates that the upper and lower primary and secondary flaps 1, 1'; 2, 2' with corresponding sections of the nozzle housing 3 may enclose pressure compensation chambers 41, 42, 43, or 44 which are sealed off with respect to the hot gas flow inside the nozzle. In the mentioned pressure compensation chambers, a back pressure may built up with respect to the static pressure in the nozzle hot-gas flow in order to mainly achieve an easy flap adjustment which consumes as little driving energy as possible. In this case, the nozzle housing 3 may therefore also be called a pressure housing in which the correspondingly relieved primary and secondary flaps are movably arranged or constructed.

As illustrated, for example, in regard to the lower nozzle half according to FIG. 7, a multi-chamber pressure compensation system can be formed which is adapted with respect to the static pressure of the hot gas nozzle flow which decreases along the respective primary and secondary flaps, for example, 1', 2', and is sealed off with respect to one another. As illustrated in the example of FIG. 7, a first chamber 42 may be formed between a section of the primary flap 1', a sealing plate 45 which can be pivoted on it, and a static counterface 46 anchored on the housing side. A second chamber 43 may be formed between the mentioned parts 46 and 45 as well as sections of the primary flap 1' (section 4') and the nozzle housing 3 on the one hand as well as a toggle-lever swivel seal 47, which is rotatably anchored on the primary flap and housing side on the other hand. A third chamber 44 may be formed between the mentioned toggle-lever lever seal 47, sections of the secondary flap 2' (holding wall 7') as well as sections of the nozzle housing 3 and the sealing flap 17 on the secondary flap end which was discussed with respect to FIGS. 2 and 3. The latter multi-chamber system may analogously also be applied to the corresponding upper configuration of primary flaps 1 and secondary flaps 2.

According to FIG. 7, suitable sealing measures must also be taken with respect to the hot gas flow at the corresponding circled points S1, S2, S3, S4 and S5.

FIG. 8 again shows the propelling nozzle from FIG. 1 in the same flap position, specifically in the nozzle position for take-off without afterburner operation. FIG. 8a is a reduced scale drawing of the propelling nozzle according to FIGS. 1 and 8 shown in the same position outlining the pertaining and adjusted nozzle throat cross-sectional surface $A_8$ and the nozzle outlet surface $A_9$. ST characterizes the propelling jet course indicated by the Mach lines with open jet boundaries. In this operating phase, a recurculating flow R is formed from taken-in ambient air between the expansion ramp 11 on the flight aggregate side and the upper exterior course of the propelling jet ST. In this phase, the flaps 40 are in the closed position. In this case, the flight Mach number $M\infty = 0$; the nozzle pressure ratio $\pi = 3$; the $C_{FGI} = 0.98$ represents the ratio between the achieved thrust and thrust that can be maximally achieved by the applied nozzle pressure ratio. Thus, $\pi$ = nozzle pressure ratio applied: $\pi = Pt_8/P\infty$ achieved: $\pi = Pt_8/P_9$, wherein $Pt_8$ is the total nozzle throat pressure; $P\infty$ is the static ambient pressure; and $P_9$ is the achieved static nozzle end pressure.

FIG. 9 illustrates the propelling nozzle according to FIG. 1 or 8, but in this case in a flap position which is representative of the connecting of an afterburner during an airplane take-off or take-off/climbing phase. It is shown in FIG. 9 that, for this purpose, the lower primary and secondary flaps 1', 2' are swivelled into a straight-line surface-flush extended position, in which case a slightly convergent/divergent nozzle contour course is made available in a corresponding assignment of the upper primary and secondary flaps 1, 2, in the case of an extremely large hot-gas mass flow surface (afterburning) according to the pertaining FIG. 9a ($A_8$). In this case, $M\infty$ is assumed to be 32 0.$\pi$, 4.4 and $C_{FGI}$ is assumed to be $= 0.97$. As mentioned analogously at the beginning, in this phase, by means of a corresponding opening of the flaps 40 by the blowing-in of inlet boundary layer (arrow or arrows U) along the expansion ramp 11, an outer bounding of the propulsion jet ST can be reached, while the lower jet boundary is otherwise open. In FIG. 9a, $A_9$ represents the nozzle outlet surface which, in this operating case, conforms with the nozzle position according to FIG. 9 and is relatively large.

FIGS. 10 and 10a show an alternative nozzle position for the operating case of FIGS. 9 and 9a. According to FIGS. 10 and 10a, in the case of a relatively low nozzle pressure ratio $\pi$, the previously mentioned and indicated blowing-in U of the inlet boundary layer is not necessary. This is true particularly when, according to FIG. 10a, the corresponding flap contour slopes, by way of the pertaining contour design of the nozzle housing starting from the nozzle throat area ($A_8$—FIG. 10a), can be largely adapted to one another. FIG. 10a also illustrates the nozzle outlet surface $A_9$, locally displaced in regard to the locally exterior fixed jet boundary at the expansion ramp 11 occurring according to FIG. 10a, with an otherwise lower open jet boundary of the propelling jet ST. In the operating case according to FIGS. 10 and 10a, the values of $M_\infty = 0$; $\pi = 4.4$; and $C_{FGI} = 0.98$ are used as the basis.

FIGS. 11 and 11a represent a nozzle position which is representative of a flight operation at an altitude of approximately 15 km. In this case the contour course of the upper primary and secondary flaps 1 and 2 corresponds to that according to FIG. 9 or possibly according to FIG. 10 so that, for the operating phase according to FIGS. 11 and 11a, for example, only the lower primary and secondary flap 1' and 2' must be adjusted with a larger convergence (primary flap 1') in addition to an insertion (secondary flap 2') that is in parallel to the nozzle axis. ST indicates the propelling jet which, corresponding to this operation phase, is widely fanned out, with a fixed jet boundary at the expansion ramp 11 (rear side) of the flight aggregate, thus with a completely filled rear surface of the flight aggregate which is optimal for the thrust. $A_8$ indicates the nozzle throat cross-sectional surface position which rules in this operating phase ($A_8$, in this case, $< A_8$ in FIGS. 10 and 10a and $< A_8$ in FIGS. 9 and 9a). In the operating phase according to FIGS. 11 and 11a, the flight Mach number $M\sqrt{}$ is assumed to be $= 3$; the nozzle pressure ratio $\pi$ is assumed to be $= 30$; and $C_{FGI}$ is assumed to be $= 0.94$.

FIG. 12 illustrates the propelling nozzle in the position according to FIG. 7, thus for an operation at a high flight altitude (approximately 30 km), for which, while the position of the lower primary and secondary flap 1' and 2' is maintained, by means of the corresponding adjustment and shifting of the upper primary and secondary flap 1, 2 with respect to the nozzle axis, the smallest possible nozzle throat cross-sectional surface is made available between the arched sections 5, 5' (see also $A_8$—FIG. 12a), while at the same time, the expansion angle is adapted correspondingly. The propelling jet course ST according to FIG. 12a is basically similar to that according to FIG. 11a, with the characteristics which are optimal with respect to the thrust and which were described with respect to FIG. 11a, which concerns particularly the aerodynamically favorable and locally fixed jet boundary and filling along the expansion ramp 11 which is optimal with respect to the thrust. For the operating phase according to FIG. 12a, a flight Mach number $M_\infty$ of $= 6.8$, the nozzle pressure ratio $\pi = 700$, and $C_{FGI} = 0.95$ are used as the basis.

In the case of the propelling nozzle according to the invention, the primary and secondary flaps 1, 1' and 2, 2' have a straight-walled course, with the exception of surfaces 5, 5'. According to the invention, the nozzle flaps may, in each case, also have a course which is at least slightly curved in the longitudinal direction.

The invention may be advantageously used not only in the case of combined air-breathing turboramjet engines but also, for example, in the case of combined turbine rocket engines.

The invention also permits a physically compact arrangement of several engines plus the respective propelling nozzle next to one another, particularly since no laterally physically projecting adjusting systems are required for the flaps. In this case, according to the invention, only a single perpendicular housing wall respectively is required between nozzle flaps adjacent in the transverse direction of a first propelling nozzle and another propelling nozzle which follows.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A propelling nozzle creating a nozzle flow and having a nozzle contour with a variable course for a turboramjet engine of a flight aggregate operable in a subsonic, supersonic and hypersonic range, the propelling nozzle comprising:

a four-cornered nozzle housing having lateral wall sections;

upper primary and secondary flaps;

lower primary and secondary flaps, said upper and lower primary and secondary flaps being disposed opposite one another at a mutual distance and being sealingly and movably guided between the lateral wall section of said four-cornered nozzle housing, said upper and lower primary flaps being pivotally arranged about a fixed axis of rotation on said nozzle housing;

first levers non-rotatably connected with said upper and lower primary flaps, said upper and lower secondary flaps being pivotally linked at an upstream end to said first levers via first pivots on the side away from the nozzle flow;

wherein said upper and lower secondary flaps transition into said upper and lower primary flaps at a surface section bent concentrically with respect to said first pivots;

wherein the turboramjet engine has a jet pipe and the flight aggregate has a radially exterior expansion ramp, said propelling nozzle being arranged between said jet pipe and the expansion ramp;

wherein said upper and lower primary and secondary flaps are arranged in said four-cornered nozzle housing in a closed manner forming a pressure housing;

wherein said upper and lower secondary flaps are arranged on said nozzle housing at their downstream ends to be axially movable and angularly adjustable;

wherein said first levers are formed on interior sections bent away from said primary flaps in a toggle-lever manner and have cut-outs concentric with respect to said first pivots allowing said surface sections to be moved into said cut-outs; and adjusting systems, each of said adjusting systems being arranged between one of an upper and lower wall portion of said nozzle housing and said upper and lower flaps, respectively, and acting upon one of said upper and lower primary and secondary flaps to pivot said flaps.

2. A propelling nozzle according to claim 1, wherein said upper and lower secondary flaps are pivotally linked at said respective primary flaps via said surface sections which form an arched nozzle surface construction, said surface sections being formed as projecting wall sections.

3. A propelling nozzle according to claim 1, wherein each of said adjusting systems comprise at least one of hydraulically and pneumatically actuated adjusting cylinders having at least one of a piston rod and lifting-tension rod, said adjusting cylinders being arranged in a transverse direction with respect to said flaps at one of an upper and lower section of said nozzle housing, one end of said rods being in the shape of pivots acting upon one of said primary or secondary flaps.

4. A propelling nozzle according to claim 3, wherein the adjusting systems are at least partially disposed in sleeve members which are accessible on the outside from the nozzle housing and are arranged on said nozzle housing in a detachable manner.

5. A propelling nozzle according to claim 1, wherein said nozzle housing, in an upper area, extends in a sloped manner from an inlet side to a nozzle outlet side in an adaptation, with respect to the direction, to the transition to said expansion ramp and, in a lower area, said nozzle housing extends from the direction of the inlet side, first in an essentially straight-walled manner, and then in an arched-in manner from the bottom exterior to the top interior of said nozzle housing in the direction of the nozzle outlet.

6. A propelling nozzle according to claim 1, further comprising:
  a connecting-link guideway arranged on said nozzle housing;
  a roller of said secondary flap located in said guideway;
  a sealing plate arranged upstream of said guideway having an extreme free end; and
  a seal rest fixed to said housing, wherein said extreme free end can be swivelled in with respect to said seal rest and can be moved in said nozzle housing.

7. A propelling nozzle according to claim 1, further comprising a guide housing which can be actuated by one of said adjusting systems and is pivotally disposed on said nozzle housing, wherein the upper secondary flap is suspended in an axially movable as well as angularly adjustable manner on said guide housing at the downstream end of said secondary upper flap.

8. A propelling nozzle according to claim 7, wherein the upper secondary flap, by means of rollers disposed on holding devices, engages in at least one connecting-link guideway of the guide housing in an angularly adjustable as well as movable manner, and wherein said upper secondary flap, at the downstream end, has a longitudinal recess, which is open at the downstream end and into which an auxiliary flap which can be swivelled about an axis below the guideway on the guide housing, said auxiliary flap bridges a free end of said upper secondary flap and, by means of guides, along rollers, moves increasingly deep into said open end when the expansion angle reduction of the propelling nozzle increases.

9. A propelling nozzle according to claim 8, wherein the upper secondary flap, upstream of the holding device, has a sealing plate which is pivotally connected to the upper secondary flap and which, by means of its extreme end, is always tangent with a plate-shaped seal rest arranged on the guide housing, with a restricted guiding which is locally integrated in said guide housing.

10. A propelling nozzle according to claim 7, wherein one of said adjusting systems is integrated on the housing side, in the upper section of the housing of the propelling nozzle, and movably acts upon said guide housing by means of at least one tension-pressure rod adjusting member.

11. A propelling nozzle according to claim 10, wherein the adjusting systems are at least partially disposed in sleeve members which are accessible on the outside from the nozzle housing and are arranged on said nozzle housing in a detachable manner.

12. A propelling nozzle according to claim 1, further comprising a guide housing wherein one of said adjusting systems is integrated on the housing side, in the upper section of the housing of the propelling nozzle, and movably acts upon said guide housing by means of at least one tension-pressure rod adjusting member.

13. A propelling nozzle according to claim 1, wherein the adjusting systems are at least partially disposed in sleeve members which are accessible on the outside from the nozzle housing and are arranged on said nozzle housing in a detachable manner.

14. A propelling nozzle according to claim 1, wherein between the upper extreme downstream end of the nozzle housing and the expansion ramp, a blow-in device is provided for the supply of air boundary layer taken in on the engine inlet side.

15. A propelling nozzle according to claim 14, wherein the blow-in device comprises flaps pivotally arranged in at least one of the center and an extreme end, said flaps being adjusted by at least one of a special driving system and synchronization with the adjustment of at least one of said primary and secondary flaps.

16. A propelling nozzle according to claim 14, wherein the blow-in device comprises flaps pivotally arranged in at least one of the center and an extreme end, said flaps being adjusted by at least one of a special driving system and synchronization with the adjustment of at least one of said primary and secondary flaps.

17. A propelling nozzle according to claim 1, wherein in the longitudinal direction on the expansion ramp, at least two blow-in devices are arranged at staggered distances for the supply of air boundary layer taken in on the engine inlet side.

18. A propelling nozzle according to claim 1, wherein at least one of said upper and lower primary and secondary flaps; and an upper set of said primary and secondary flaps with only one adjusting system when the lower set of primary and secondary flaps is arranged to fixedly adjusted, forms a convergently/divergently designed nozzle inside contour course, with the narrow nozzle point at the nozzle outlet, that can be adjusted to a convergent/divergent nozzle with small to very large nozzle throat cross-sections and small to very large divergence ratios.

19. A propelling nozzle according to claim 1, wherein said pressure housing is sealed off inside the nozzle with respect to the hot gas flow and includes several pressure compensating chambers which are sealed off with respect to one another, a first chamber being formed between a primary-flap section, a sealing plate, which can be swivelled on the primary-flap section, and a static counterface anchored on the housing side;
  a second chamber being formed between said sealing plate, said static counterface, as well as sections of the primary flap and of the nozzle housing, on the one side, as well as a toggle-lever swivel seal rotatably anchored on the primary flap and housing side; and
  a third chamber being formed between the toggle-lever seal, sections of the secondary flap and of the nozzle housing and a sealing flap on the secondary flap end.

* * * * *